(12) United States Patent
Lin

(10) Patent No.: US 8,693,223 B2
(45) Date of Patent: Apr. 8, 2014

(54) POWER CONVERTER WITH ZERO VOLTAGE SWITCHING AND RELATED CONTROL METHOD THEREOF

(75) Inventor: Cody Lin, Taoyuan County (TW)

(73) Assignee: FSP Technology Inc., Taoyuan, Taoyuan County (TW)

( * ) Notice: Subject to any disclaimer, the term of this patent is extended or adjusted under 35 U.S.C. 154(b) by 245 days.

(21) Appl. No.: 13/401,856

(22) Filed: Feb. 22, 2012

(65) Prior Publication Data

US 2012/0212981 A1    Aug. 23, 2012

Related U.S. Application Data

(60) Provisional application No. 61/445,537, filed on Feb. 23, 2011.

(30) Foreign Application Priority Data

Jan. 31, 2012    (TW) .............................. 101103037 A

(51) Int. Cl.
*H02M 3/335*    (2006.01)
*H02H 7/122*    (2006.01)

(52) U.S. Cl.
USPC ................... 363/56.12; 363/21.03; 363/21.12

(58) Field of Classification Search
USPC .......... 363/21.03, 56.11, 56.12, 21.12, 21.08; 361/111, 91.7, 18
See application file for complete search history.

(56) References Cited

U.S. PATENT DOCUMENTS

| | | | | |
|---|---|---|---|---|
| 6,690,586 | B2 * | 2/2004 | Hosotani et al. | 363/19 |
| 7,382,633 | B2 * | 6/2008 | Aso et al. | 363/21.04 |
| 7,405,951 | B2 * | 7/2008 | Tsuruya | 363/21.04 |
| 7,633,777 | B2 * | 12/2009 | Lin | 363/56.11 |
| 7,869,235 | B2 * | 1/2011 | Lin et al. | 363/56.11 |

\* cited by examiner

*Primary Examiner* — Bao Q Vu
*Assistant Examiner* — Zekre Tsehaye
(74) *Attorney, Agent, or Firm* — Winston Hsu; Scott Margo

(57) ABSTRACT

A power converter includes an output unit, a first transformer, a switch unit, and a processing unit. The first transformer includes a primary winding and a secondary winding. The primary winding is coupled between an input voltage and a first node. The switch unit is coupled between the first node and a second node. The processing unit is coupled between the input voltage and the first node. When the switch unit is in an OFF state, the processing unit is used to receive a first sensing voltage and store a sensing power of the first sensing voltage through a first path, isolate the first sensing voltage from feeding in through a second path different from the first path simultaneously, and then release the stored sensing power through the second path. The first sensing voltage is generated as the switch unit switches from an ON state to the OFF state.

24 Claims, 13 Drawing Sheets

POWER CONVERTER WITH ZERO VOLTAGE SWITCHING AND RELATED CONTROL METHOD THEREOF

CROSS REFERENCE TO RELATED APPLICATIONS

This application claims the benefit of U.S. provisional application No. 61/445,537, which was filed on Feb. 23, 2011 and entitled "FLY-BACK CONVERTER WITH PARTIAL CLAMP" and is incorporated herein by reference.

BACKGROUND OF THE INVENTION

1. Field of the Invention

The disclosed embodiments of the present invention relate to power conversion, and more particularly, to a flyback power converter which operates in continuous conduction mode and is able to realize the zero voltage switching, and related control method thereof.

2. Description of the Prior Art

Due to simpler circuit architecture and higher power conversion efficiency, the flyback power converter has been applied to various circuit designs broadly. However, there is large ripple in the output voltage of the flyback power converter, which causes the flyback power converter to be limited to low output power applications. Please refer to FIG. 1 and FIG. 2 together. FIG. 1 is a diagram illustrating a conventional flyback power converter 100, and FIG. 2 is a timing diagram of signals in the flyback power converter 100 shown in FIG. 1. As shown in FIG. 1, an input voltage V_IN is converted to an output voltage V_OUT by a transformer 130. A control unit 150 controls the ON/OFF state of each of a main switch element 110 and an auxiliary switch element 120, a transformer 152 is arranged to maintain isolation between the main switch element 110 and the auxiliary switch element 120, and a secondary side current I_S is outputted from a diode 140 and a capacitor 142. The main switch element 110 includes a transistor 111 having a body diode 112, coupled between the drain and source of the transistor 111, and a stray capacitor 113. The auxiliary switch element 120, which acts as an active clamping circuit, includes a transistor 121 having a body diode 122 coupled between the drain and source of the transistor 121, and a stray capacitor 123. As shown in FIG. 2, when the main switch element 110 is turned off (i.e., the voltage V_P is at a low voltage level), the flyback power converter 100 absorbs leakage inductance power of the transformer 130, which is stored into a capacitor 125, to lower the voltage ripple of the voltage V_D by utilizing the auxiliary switch element 120 (controlled by a voltage V_A). Therefore, the flyback power converter 100 is able to realize the zero voltage switching (ZVS) in continuous conduction mode (CCS), which achieves the objective of enhancing the power conversion efficiency.

It should be noted that, as shown in FIG. 2, during the period the main switch element 110 is turned off, the current I_A flows through the transformer 130 twice back and forth, and the area A1 enclosed by the current I_A and the time axis is very large. In addition, the area A1 is even larger than the area A2, which is enclosed by the current I_M during the period the main switch element 110 is turned on, and therefore the unwanted power provided to the primary winding of the transformer 130 is quite high. As can be seen from the waveform of the voltage V_D, there is current flowing continuously through the primary-side circuit of the transformer 130 during the period the main switch element 110 is turned off. That is, power consumption occurs in the flyback power converter 100 due to the circulating current. Even though the ZVS is realized to enhance the conversion efficiency, the saved power may be cancelled out due to the generated circulating current. In addition, there is phase shift in the secondary-side current (i.e., the current I_S), which causes that the current I_S increases gradually during the period the main switch element 110 is turned off and then falls off abruptly when the auxiliary switch element 120 is turned off. The root-mean-square (RMS) value of the current I_S may increase, which accompanies the increase in the power loss of the circuit elements in the secondary-side synchronous rectifier circuit of the transformer 130.

In brief, the conventional flyback power converter 100 has the problems resulting from large circulating current flowing through the active clamping circuit and the phase shift in the secondary-side current. The large circulating current may cause a relatively high conduction loss, and the phase shift in the secondary-side current may cause the secondary-side switch element to generate a higher voltage spike. Therefore, the switching loss is higher and the overall conversion efficiency is poor, which fails to achieve the major objective of enhancing the power efficiency.

Thus, there is a need for an innovative power converter capable of realizing ZVS in CCM operation to solve the above-mentioned power loss problem.

SUMMARY OF THE INVENTION

In accordance with exemplary embodiments of the present invention, a flyback power converter which operates in continuous conduction mode and is able to realize the zero voltage switching and related control method thereof are proposed to solve the above-mentioned power loss problem.

According to an embodiment of the present invention, an exemplary power converter is disclosed. The exemplary power converter includes an output unit, a first transformer, a switch unit, and a processing unit. The output unit is arranged for outputting a converted voltage. The first transformer includes a primary winding and a secondary winding. The primary winding is coupled between an input voltage and a first node. The secondary winding is coupled to the output unit. The switch unit is coupled between the first node and a second node, and arranged for controlling magnetic flux direction of the primary winding. The processing unit is coupled between the input voltage and the first node, and arranged for when the switch unit is in an OFF state, receiving a first sensing voltage of the first node and storing a sensing power of the first sensing voltage through a first path, isolating the first sensing voltage from feeding in through a second path different from the first path simultaneously, and then releasing the stored sensing power through the second path, wherein the first sensing voltage is generated in response to the switch unit switching from an ON state to the OFF state.

According to an embodiment of the present invention, an exemplary control method of a power converter is disclosed. The power converter includes an output unit, a first transformer, and a switch unit. The output unit is arranged for outputting a converted voltage. The first transformer includes a primary winding and a secondary winding. The primary winding is coupled between an input voltage and a first node. The secondary winding is coupled to the output unit. The switch unit is coupled between the first node and a second node, and arranged for controlling magnetic flux direction of the primary winding. The exemplary control method includes: when the switch unit is in an OFF state, receiving a first sensing voltage and storing a sensing power of the first sensing voltage through a first path, and isolating the first sensing voltage from feeding in through a second path different from the first path simultaneously; and releasing the stored sensing power through the second path to the first node. The first sensing voltage is generated in response to the switch unit switching from an ON state to the OFF state.

The proposed power converter may be applied to power supply circuit. The proposed power converter may clamp the voltage spike generated in the power converter, realize high conversion efficiency of the zero voltage switching, and overcome the limitation that the conventional flyback power converter may only be applied to the low-power power supply circuit.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is to use partial clamp to isolate and immediately store the voltage spike generated in the power converter simultaneously through different circuit paths, and then release the stored energy. No only is the effect of the voltage spike on the conversion efficiency reduced, but also the stored energy is recovered. Thus, the conversion efficiency of the power converter is improved much more. Further description is detailed as follows.

Figure 1:
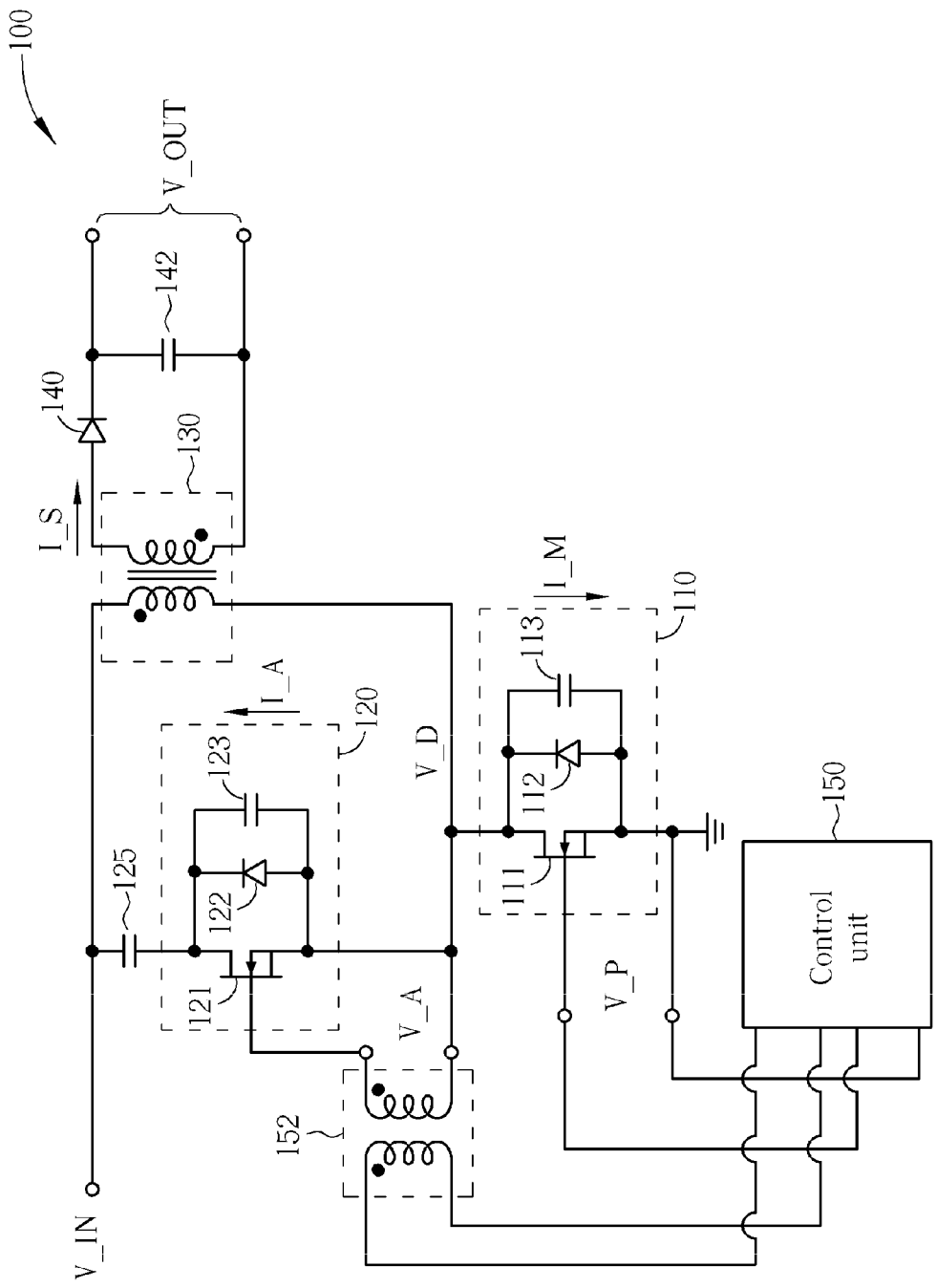
FIG. 1 is a diagram illustrating a conventional flyback power converter.
Figure 2:
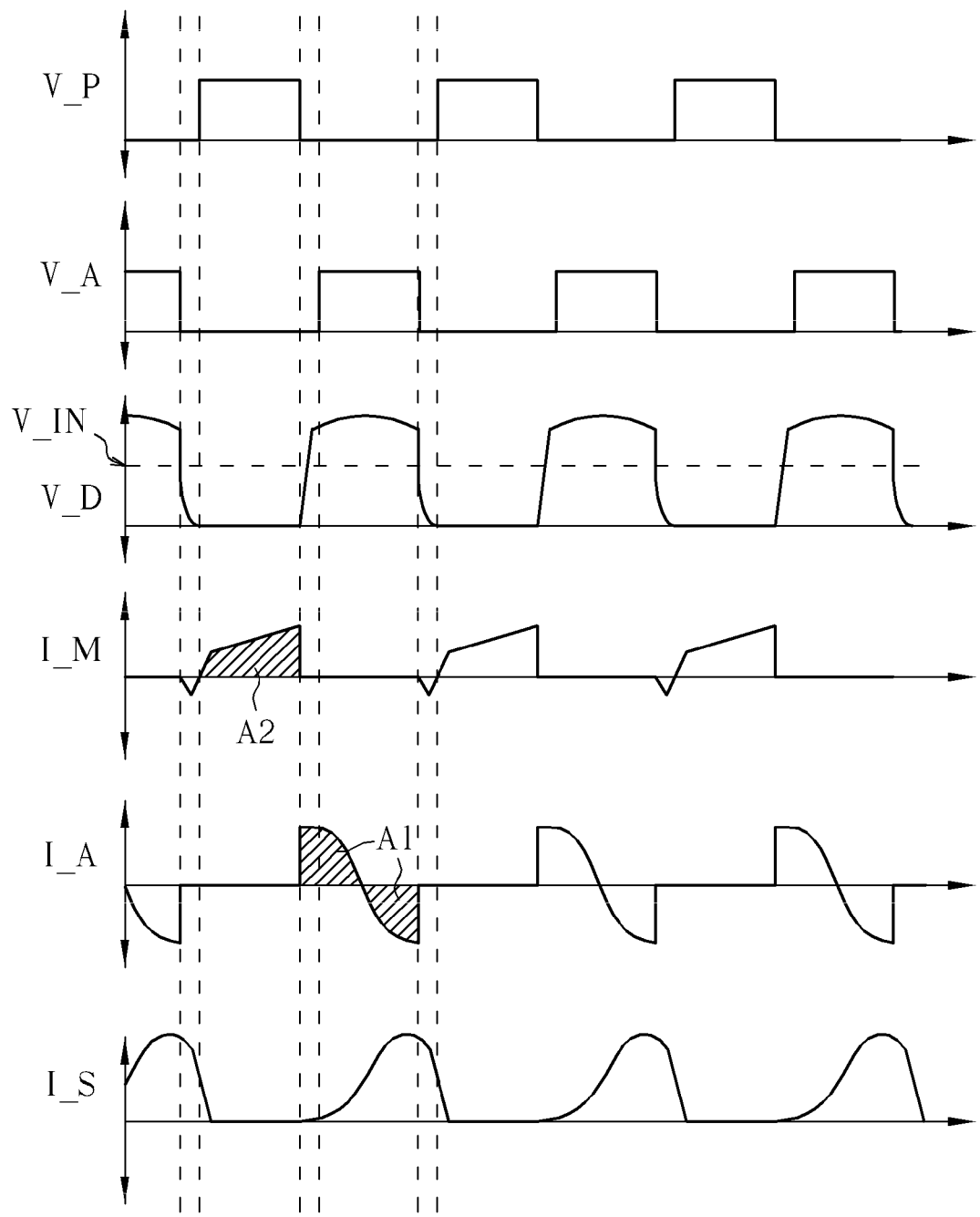
FIG. 2 is a timing diagram of signals in the flyback power converter shown in FIG. 1.
Figure 3:
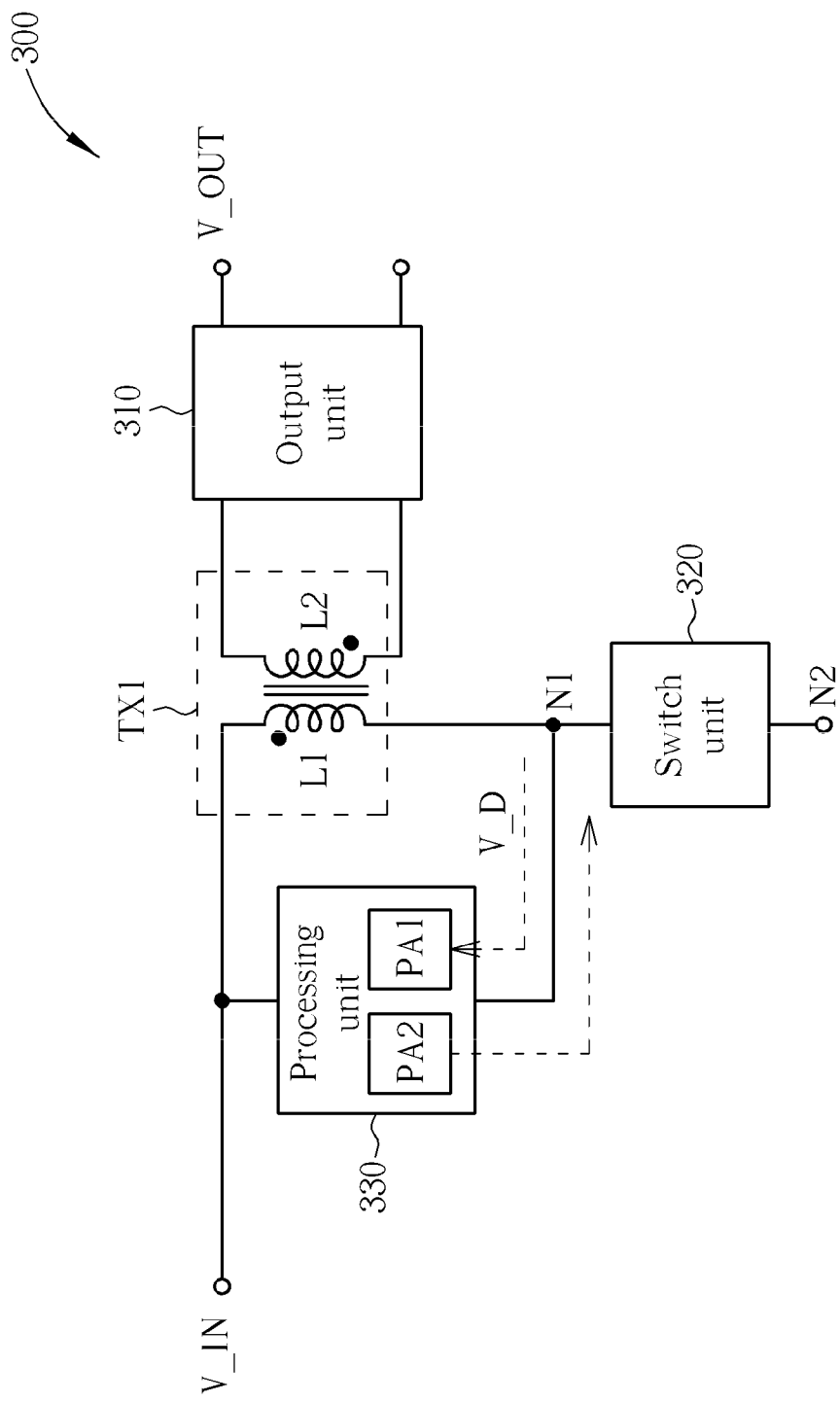
FIG. 3 is a block diagram illustrating a generalized power converter according to an embodiment of the present invention.

Please refer to FIG. 3, which is a block diagram illustrating a generalized power converter according to an embodiment of the present invention. The power converter 300 includes an output unit 310, a first transformer TX1, a switch unit 320, and a processing unit 330. The first transformer TX1 includes a primary winding L1 and a secondary winding L2. The primary winding L1 is coupled between an input voltage V_IN and a first node N1, and the secondary winding L2 is coupled to the output unit 310. The switch unit 320 is coupled between the first node N1 and a second node N2, and arranged for controlling magnetic flux direction of the primary winding L1. In other words, due to the switching operation of the switch unit 320, the input voltage V_IN may be converted to a corresponding converted voltage V_OUT by the first transformer TX1, and the converted voltage V_OUT is outputted from the output unit 310. A first sensing voltage V_D is generated in response to the switch unit 320 switching from an ON state to an OFF state. Thus, the processing unit 330 is coupled between the input voltage V_IN and the first node N1, and arranged for receiving the first sensing voltage V_D of the first node N1 and storing a sensing power of the first sensing voltage through a first path PA1 (in the processing unit 330), isolating the first sensing voltage V_D to feed in through a second path different PA2 (in the processing unit 330) from the first path PA1 simultaneously, and then releasing the stored sensing power through the second path PA2 when the switch unit 320 is in the OFF state. The aforementioned sensing power is derived from leakage inductance energy of the inner winding of the first transformer TX1, and therefore a voltage spike may be generated at the first node N1. The circuit elements and operation principle of the processing unit 330 are described in detail as follows.

Please note that, in a case that the processing unit 330 may immediately receive the first sensing voltage V_D and store the sensing power, and the first sensing voltage V_D may be kept isolated from the second path PA2, as the current flowing through the primary-side circuit of the first transformer TX1 is substantially zero before the sensing power is released, the power loss of the power converter 300 is reduced much more. In an implementation, once the switch unit 320 is switched to the OFF state from the ON state, the processing unit may immediately store the sensing power. In addition, after releasing the sensing power, the processing unit 330 is turned off when the switch unit 320 is going to be switched from the OFF state to the ON state. Thus, the zero voltage switching (ZVS) is achieved. In brief, a sum of a time period required by the processing unit 330 to receive the first sensing voltage V_D and store the sensing power and a time period required by the processing unit 330 to release the stored sensing power is less than a time period in which the switch unit 320 stays in the OFF state. When the switch unit 320 is going to be switched from the OFF state to the ON state, a voltage difference between the first node N1 and the second node N2 is substantially zero. Moreover, the time period required by the processing unit 330 to release the stored sensing power and a time period in which the switch unit 320 stays in the ON state are non-overlapping.

Figure 4:
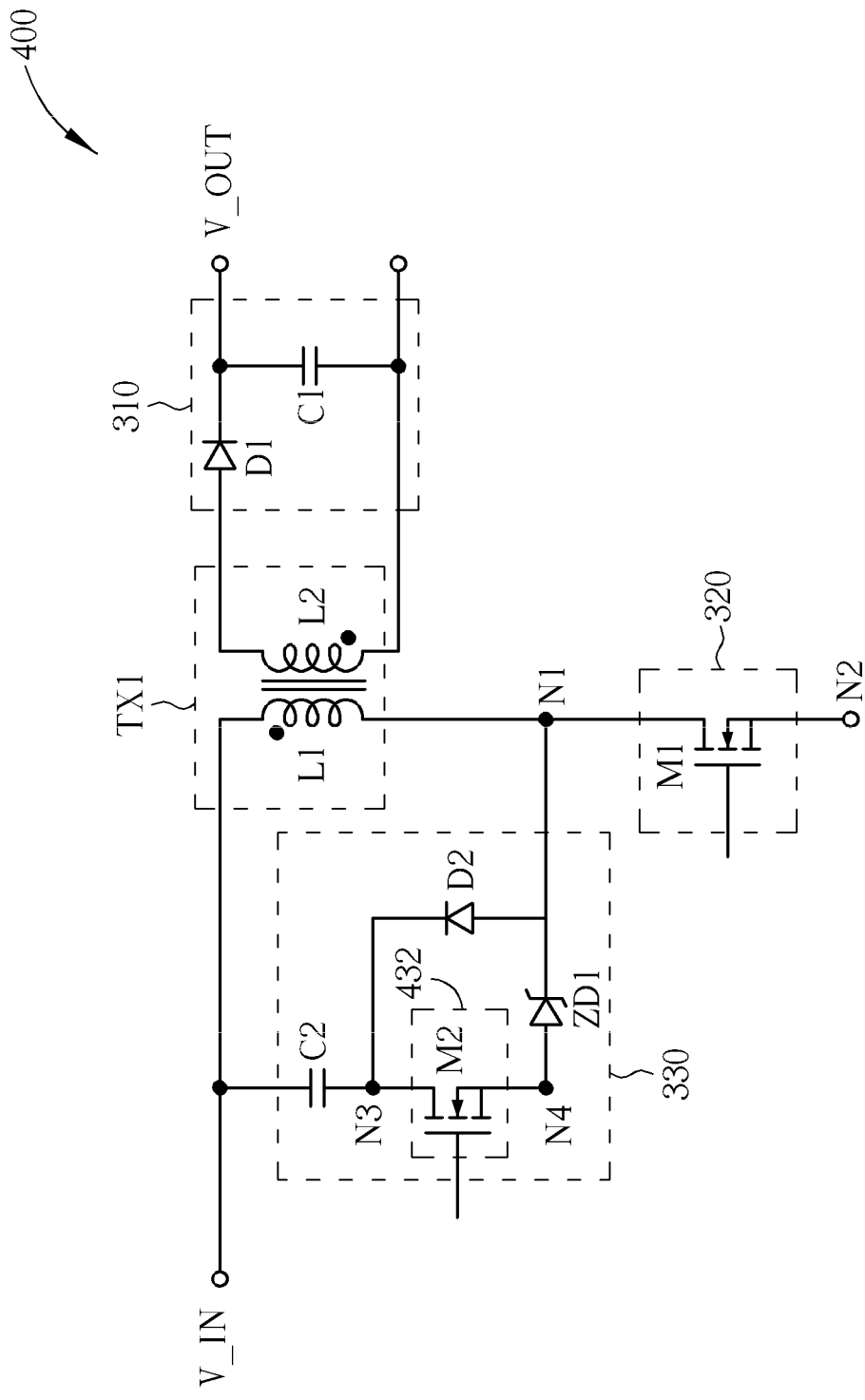
FIG. 4 is a diagram illustrating an exemplary implementation of the power converter shown in FIG. 3.

Please refer to FIG. 4, which is a diagram illustrating an exemplary implementation of the power converter 300 shown in FIG. 3. The output unit 310 includes, but is not limited to, a diode D1 and a capacitor C1. The diode D1 is coupled between the secondary winding L2 of the first transformer TX1 and the converted voltage V_OUT, and the capacitor C1 is coupled to the converted voltage V_OUT, wherein the diode D1 and the capacitor C1 is coupled in series across the secondary winding L2. The switch unit 320 includes, but is not limited to, a transistor M1, wherein the magnetic flux direction of the primary winding L1 may be controlled by switching on/off the transistor M1. The processing unit 330 includes, but is not limited to, a capacitor C2, an auxiliary switch 432, a diode D2, and a Zener diode ZD1. The capacitor C2 is coupled between the input voltage V_IN and a third node N3; The auxiliary switch 432 is coupled between the third node N3 and a forth node N4; The diode D2 is coupled between the first node N1 and the third node N3; and The Zener diode ZD1 is coupled between the first node N1 and the forth node N4. In this implementation, the diode D2 is disposed in the first path PA1, and arranged for receiving the first sensing voltage V_D and storing the sensing power into the capacitor C2 when the switch unit 320 (e.g., the transistor M1) is switched from the ON state to the OFF state. In addition, the Zener diode ZD1 is disposed in the second path PA2, and arranged for isolating the first sensing voltage V_D when the switch unit 320 (e.g., the transistor M1) is switched to the OFF state. Please note that, in this implementation, the auxiliary switch 432 is turned on after the switch unit 320 (e.g., the transistor M1) is turned off, the auxiliary switch 432 is turned off before the switch unit 320 (e.g., the transistor M1) is turned on, and the processing unit 330 releases the sensing power during a time period in which the auxiliary switch 432 is turned on.

By way of example, but not limitation, the auxiliary switch 432 may be implemented by a transistor M2. More practically, the first path PA1 may be regarded as being composed of the first node N1, the diode D2, and the third node N3, and the second path PA2 may be regarded as being composed of the first node N1, the Zener diode ZD1, and the forth node N4, the transistor M2, and the third node N3. As apparent from the above description, during a specific period in which the switch unit 320 (e.g., the transistor M1) stays in the OFF state (i.e., a certain period of time after the diode D2 stores the sensing power into the capacitor C2 and before the transistor M2 is turned on to release the sensing power to the first node N1), each of the auxiliary switch 432 (e.g., the transistor M2), the diode D2, and the Zener diode ZD1 has no current flowing therethrough. To put it in another way, there is no current flowing through the first path PA1 and the second path PA2 during the specific period, which may solve the problem of power loss in the conventional power converter due to the circulating current.

Figure 5A:
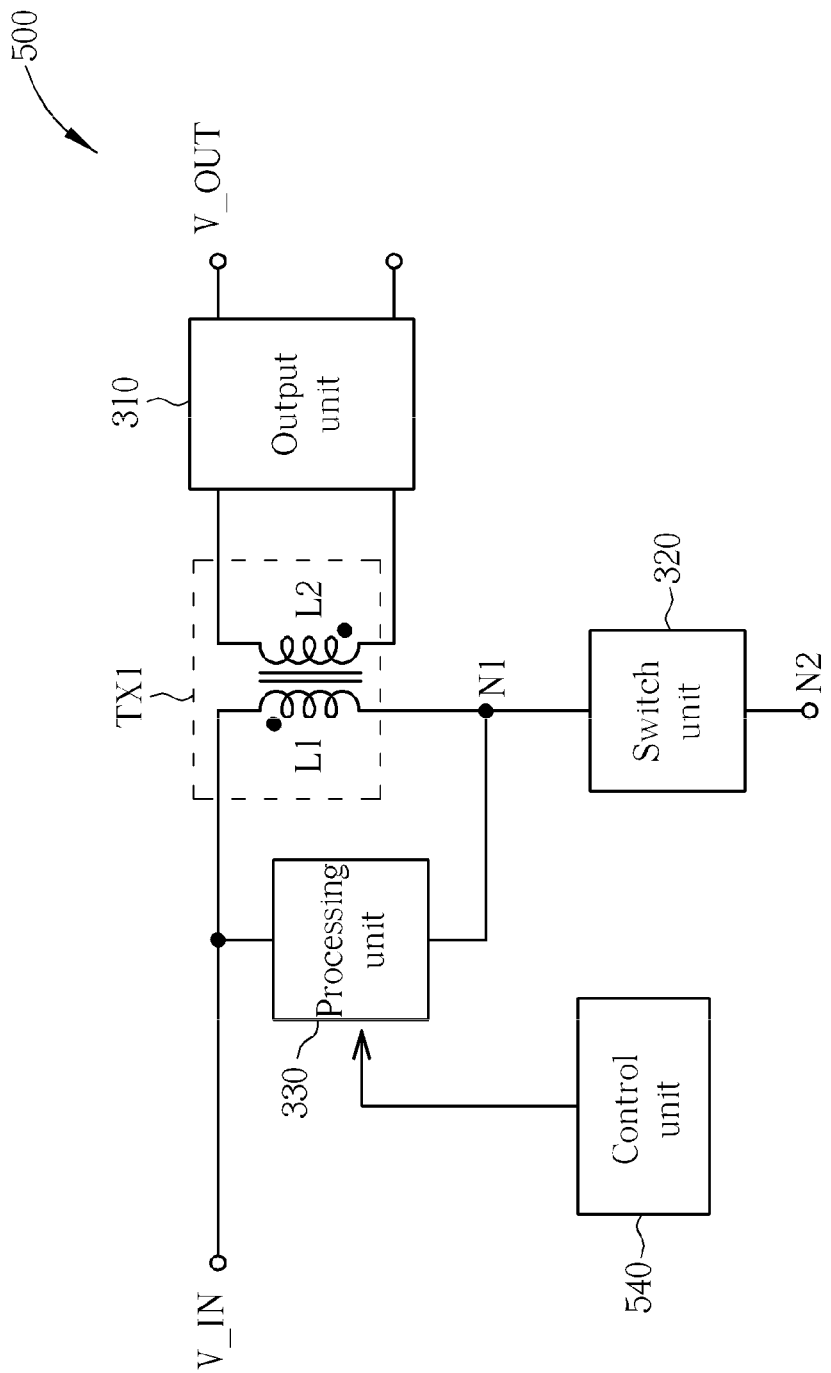
FIG. 5A is a diagram illustrating an exemplary power converter according to an embodiment of the present invention.

In an embodiment, the power converter 300 shown in FIG. 3 may further include a control unit, wherein the control unit may be arranged to control the process timing of the processing unit 330 to process the first sensing voltage V_D and the sensing power. Please refer to FIG. 5A, which is a diagram illustrating an exemplary power converter according to an embodiment of the present invention. The architecture of the exemplary power converter 500 is based on the architecture of the power converter 300 shown in FIG. 3, and the major difference therebetween is that the exemplary power converter 500 further includes a control unit 540 coupled to the processing unit 330. Since the objective of enhancing the efficiency is achieved by employing the power converter 500 to store and release the sensing power for reducing the power loss, a time period required to release the sensing power may be determined by amount of the sensing power corresponding to the converted voltage V_OUT and the first sensing voltage V_D. In this embodiment, the control unit 540 is arranged to refer to the converted voltage V_OUT outputted from the output unit 310 to determine a time period required by the processing unit 330 to release the stored sensing power. In an alternative design, the control unit 540 may be arranged to refer to the first sensing voltage V_D to determine the time period required by the processing unit 330 to release the stored sensing power.

In another embodiment, the power converter 300 shown in FIG. 3 may further include a control unit, wherein the control unit may control the switching of the switch unit 320 according to the converted voltage V_OUT outputted from the output unit 310. Please refer to FIG. 5B, which is a diagram illustrating another exemplary power converter according to another embodiment of the present invention. The architecture of the exemplary power converter 502 is based on the architecture of the power converter 300 shown in FIG. 3, and the major difference therebetween is that the exemplary power converter 502 further includes a control unit 542 coupled to the processing unit 330, and the control unit 542 may control the switch unit 320 to turn on or turn off according to the converted voltage V_OUT outputted from the output unit 310. In general, a switch control signal may be a pulse signal. Thus, in this embodiment, the control unit 542 may include a pulse width modulation (PWM) controller 543, which is arranged for generating a first control signal S_C1 according to the converted voltage V_OUT outputted from the output unit 310 for controlling the switch unit 320 to turn on or turn off.

Figure 5B:
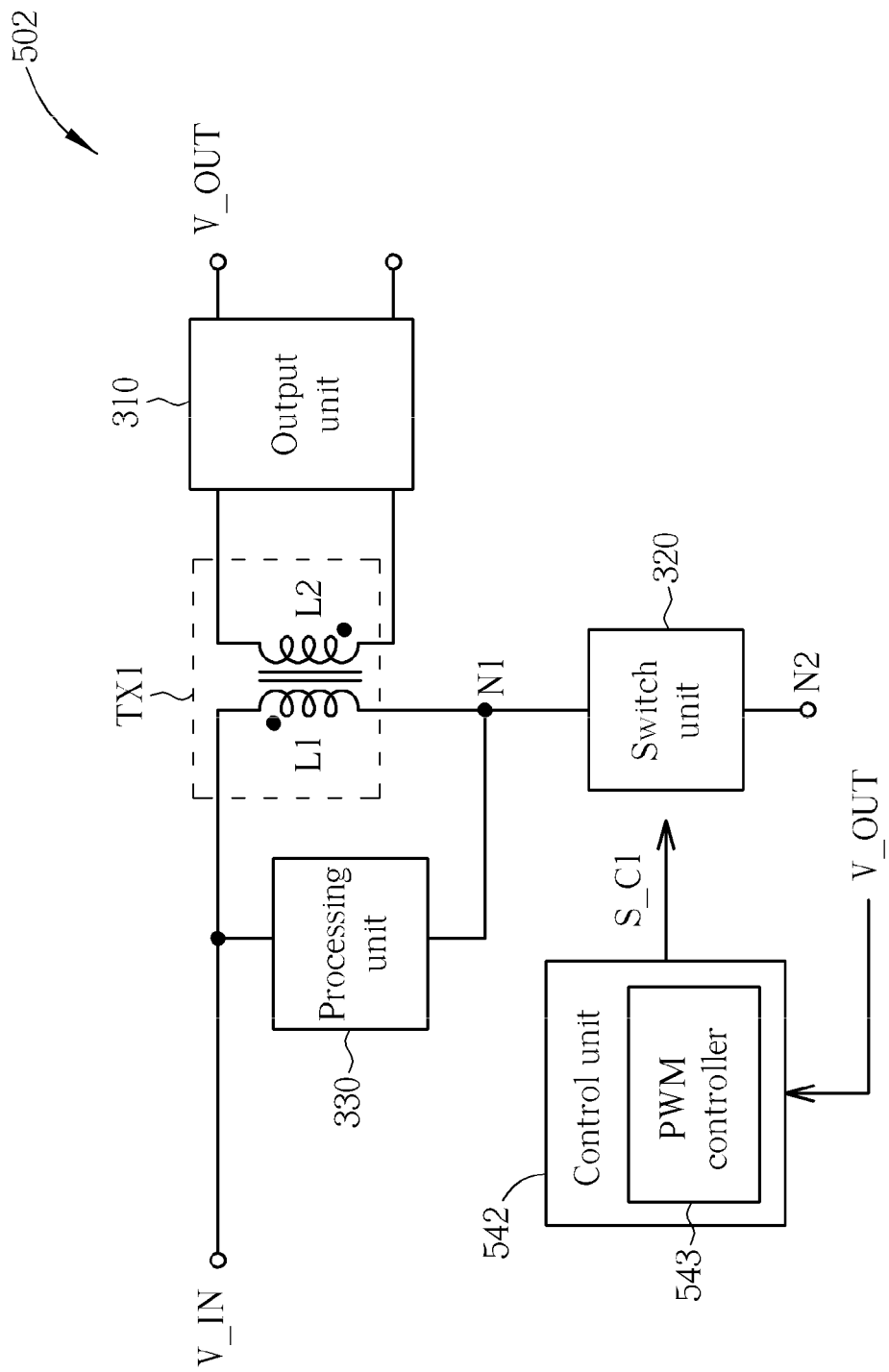
FIG. 5B is a diagram illustrating another exemplary power converter according to another embodiment of the present invention.
Figure 6:
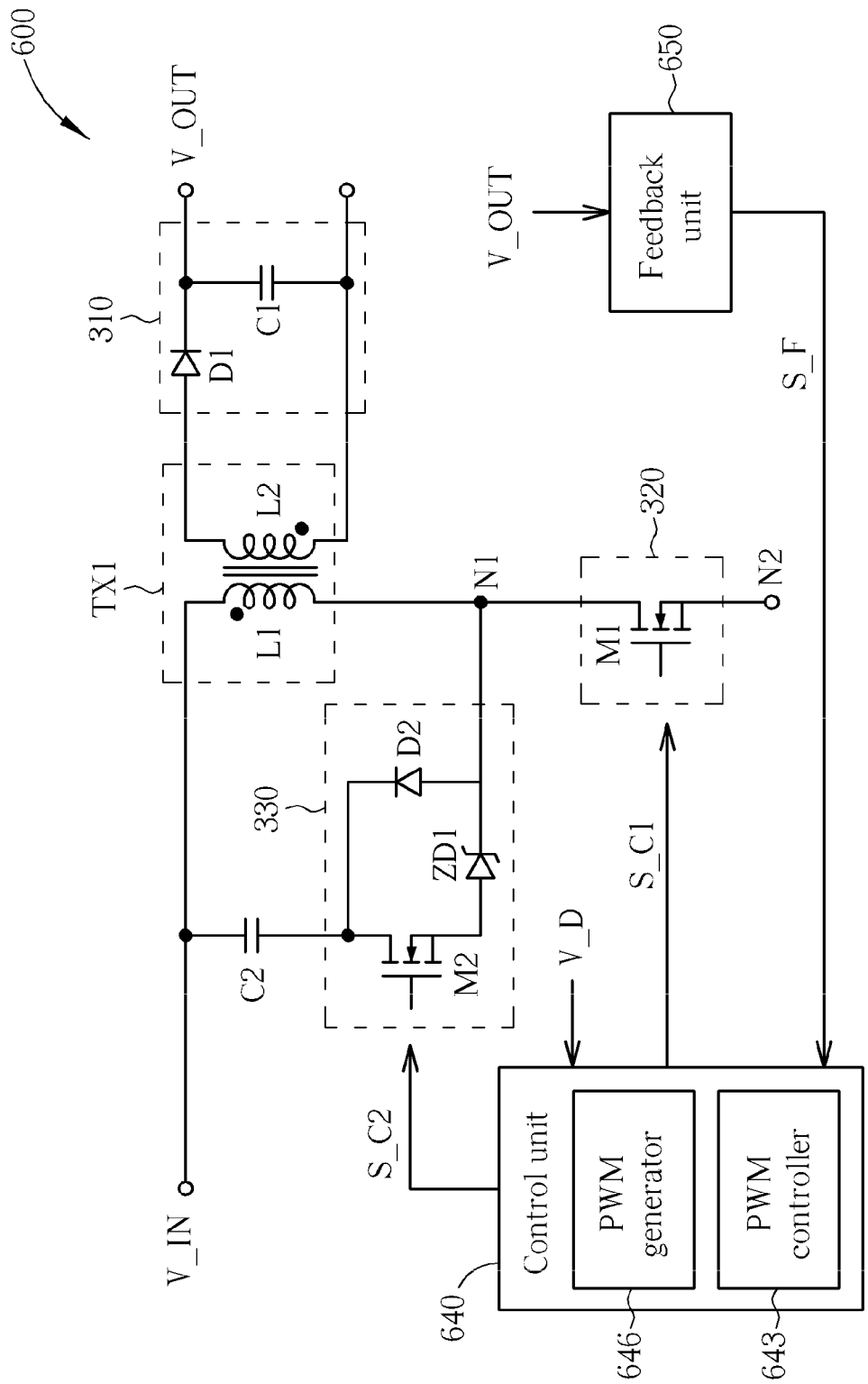
FIG. 6 is a block diagram illustrating another generalized power converter according to another embodiment of the present invention.

Please refer to FIG. 6, which is a block diagram illustrating another generalized power converter according to another embodiment of the present invention. The architecture of the power converter 600 is based on the architecture of the exemplary power converters shown in FIG. 4, FIG. 5A, and FIG. 5B. The power converter 600 includes the output unit 310, the first transformer TX1, the processing unit 330, and the switch unit 320 shown in FIG. 4, and further includes a control unit 640 and a feedback unit 650. Please note that, in this embodiment, both of the switch unit 320 and the processing unit 330 may be controlled by the control unit 640, and the control unit 640 may obtain a signal corresponding to the converted voltage V_OUT from the feedback unit 650. The control unit 640 includes a PWM controller 643 and a PWM generator 646. The feedback unit 650 is coupled between the output unit 310 and the PWM controller 643, and arranged for generating a feedback signal S_F according to the converted voltage V_OUT outputted from the output unit 310. The PWM controller 643 may generate a first control signal S_C1 according to the feedback signal S_F, and control the switch unit 320 to turn on or turn off. The PWM generator 646 is coupled to the PWM controller 643 and the processing unit 330, and arranged for generating a second control signal S_C2 according to the first control signal S_C1 and the first sensing voltage V_D for controlling the processing unit 330 to process the first sensing voltage V_D. As mentioned above, the time period required by the processing unit 330 to release the sensing power may be determined by the amount of the sensing power corresponding to the converted voltage V_OUT and the first sensing voltage V_D. Therefore, in one design, the PWM generator 646 may control the processing unit 330 to process the first sensing voltage V_D according to the converted voltage V_OUT. It should be noted that the feedback unit 650 is an optional element, that is, the control unit 640 may also perform control operations directly according to the converted voltage V_OUT outputted from the output unit 310.

In brief, when the transistor M1 is cut off, the sensing power stored in the leakage inductance of the inner winding of the first transformer TX1 may be released immediately through the diode D2 to the capacitor C2 for storage, thereby reducing/eliminating a voltage spike generated by the sensing power (i.e., the energy stored in the leakage inductance). In addition, during a time period in which the transistor M1 is turned off, the Zener diode ZD1 is arranged for isolating the first sensing voltage V_D from feeding into the transistor M2 from the first node N1. Next, based on amount of the output power (e.g., amount of the converted voltage V_OUT and/or the sensing power) of the output unit 310, the control unit 640 may generate a pulse of correspondent duration to drive the transistor M1. The sensing power is released back to the first transformer TX1, and then transmitted to the output unit 310 on the secondary side for output. In the meanwhile, the ZVS operation is also realized to enhance conversion efficiency. In addition, as the conduction period of the transistor M1 is short, the power loss of the power converter 600 is less.

Figure 7:
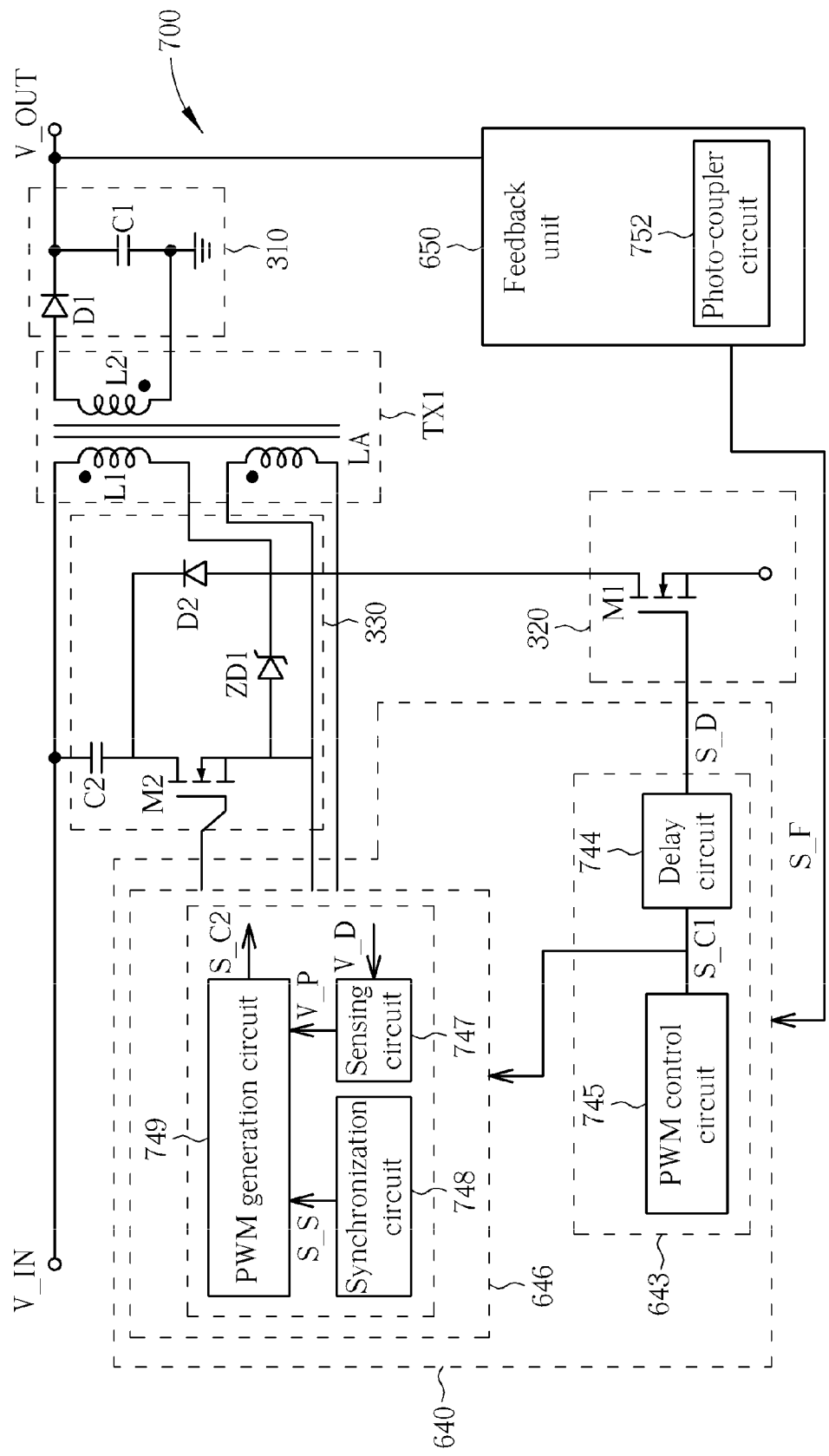
FIG. 7 is a diagram illustrating another exemplary power converter according to another embodiment of the present invention.

Please refer to FIG. 7, which is a diagram illustrating another exemplary power converter according to another embodiment of the present invention. The power converter 700 includes a plurality of circuit elements, including the first transformer TX1, the output unit 310, the switch unit 320, and the processing unit 330 shown in FIG. 4, and further includes a control unit 640 and a feedback unit 650 shown in FIG. 6. The control unit 640 includes a PWM controller 643 and a PWM generator 646. In this embodiment, the PWM controller 643 includes a delay circuit 744 and a PWM control circuit 745. The delay circuit 744 is coupled to the switch unit 320 (i.e., the transistor M1).The PWM control circuit 745 is coupled to the delay circuit 744, and arranged for generating the first control signal S_C1 to the delay circuit 744 according to the feedback signal S_F outputted from the feedback unit 650, wherein the delay circuit 744 generates a delay control signal S_D according to the first control signal S_C1 for controlling the switch unit 320 (i.e., the transistor M1) to turn on or turn off. In one design, the PWM control circuit 745 may also generate the first control signal S_C1 to the delay circuit 744 directly according to the converted voltage V_OUT outputted from the output unit 310. In this implementation, the feedback unit 650 may include a photo-coupler circuit 752 for improving the signal quality of the feedback signal S_F.

In addition, the first transformer TX1 further includes an auxiliary winding LA disposed on a same side where the primary winding L1 of the first transformer TX1 is disposed, and the PWM generator 646 includes a sensing circuit 747, a synchronization circuit 748, and a PWM generation circuit 749. The sensing circuit 747 is arranged for sensing the first sensing voltage V_D with the auxiliary winding LA, and accordingly generating a second sensing voltage V_P. The synchronization circuit 748 is coupled to the PWM controller 643, and arranged for generating a synchronization signal S_S according to the first control signal S_C1. The PWM generation circuit 749 is coupled to the processing unit 330, the sensing circuit 747, and the synchronization circuit 748, and arranged for generating the second control signal S_C2 according to the second sensing voltage V_P and the synchronization signal S_S in order to control a time period required by the processing unit 330 to isolate the first sensing voltage V_D and a time period required by the processing unit 330 to release the stored sensing power. When the second sensing voltage V_P falls to a predetermined voltage level, which implies that the converted voltage V_OUT keeps decreasing and the power converter 700 tends to enter a next drive cycle, the PWM generation circuit 749 may control the processing unit 330 to start releasing the stored sensing power to the primary winding L1; and when the sensing power is totally released, the PWM generation circuit 749 refers to the synchronization signal S_S to stop the processing unit 330 from processing the first sensing voltage V_D, and the switch unit 320 is switched from the OFF state to the ON state according to the first control signal S_C1.

Figure 8:
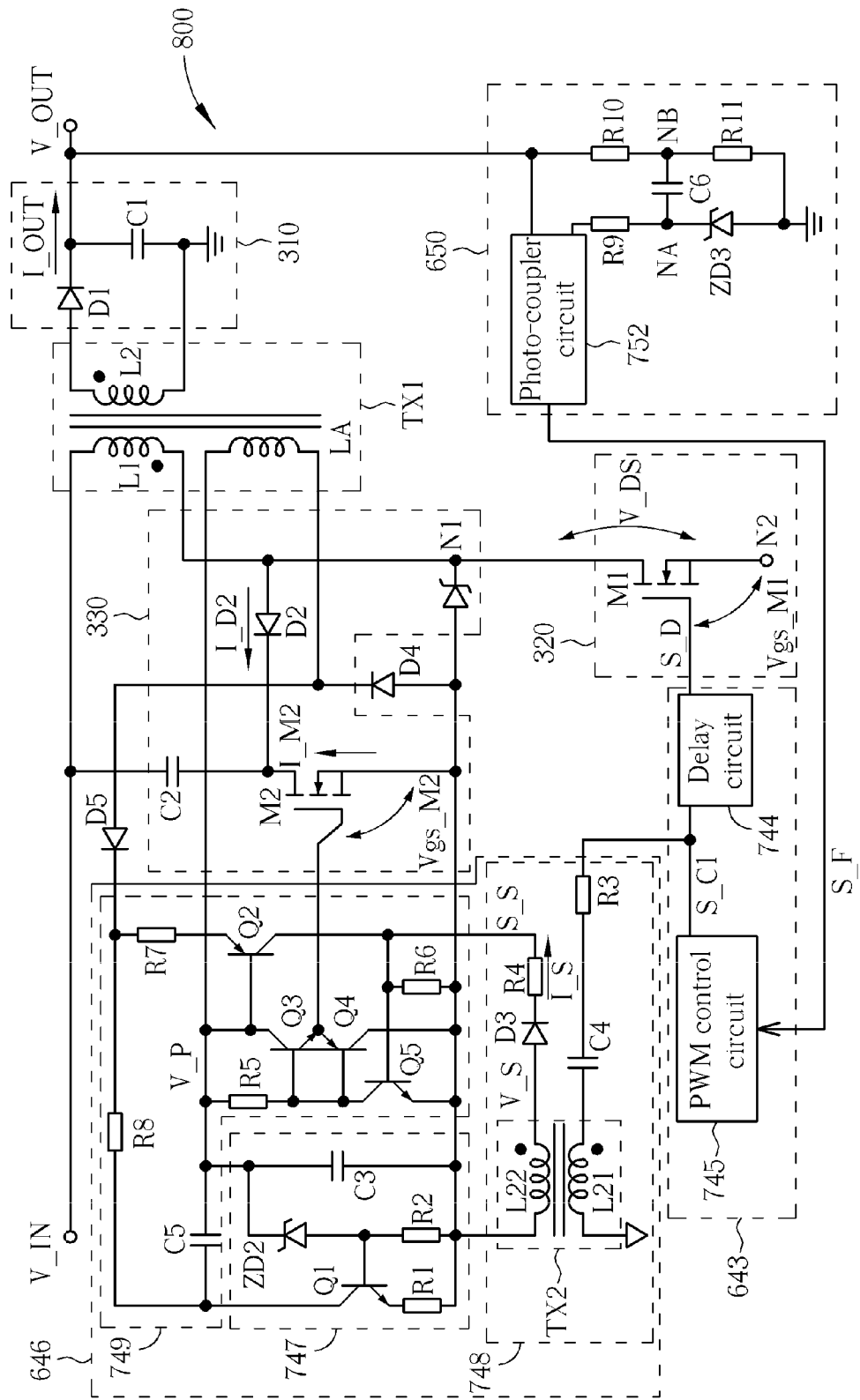
FIG. 8 is a diagram illustrating an exemplary implementation of the power converter 700 shown in FIG. 7.

Please refer to FIG. 8, which is a diagram illustrating an exemplary implementation of the power converter 700 shown in FIG. 7. As shown in FIG. 8, the sensing circuit 747 includes, but is not limited to, a bipolar junction transistor (BJT) Q1, a plurality of resistive elements R1, R2, a Zener diode ZD2, and a capacitor C3. The BJT Q1 has a collector, a base, and an emitter; the resistive element R1 is coupled to the emitter of the BJT Q1; the resistive element R2 is coupled to the base of the BJT Q1; the Zener diode ZD2 is coupled to the base of the BJT Q1, and arranged for clamping the second sensing voltage V_P; and the capacitor C3 is coupled to the Zener diode ZD2, and arranged for storing the second sensing voltage V_P.

In this embodiment, the synchronization circuit 748 includes, but is not limited to, a plurality of resistive elements R3, R4, a capacitor C4, a second transformer TX2, and a diode D3. The resistive element R3 is coupled to the PWM controller 643, and arranged for receiving the first control signal S_C1; the capacitor C4 is coupled to the resistive element R3; the second transformer TX2 has a first winding L21 and a second winding L22, wherein the first winding L21 is coupled to the capacitor C4, and the first winding L21 generates a synchronization sensing voltage V_S across the second winding L22 according to the first control signal S_C1; the diode D3 is coupled to the second winding L22, and arranged for receiving the synchronization sensing voltage V_S; and the resistive element R4 is coupled to the diode D3, and arranged for generating the synchronization signal S_S according to the synchronization sensing voltage V_S.

In addition, the PWM generation circuit 749 includes, but is not limited to, a capacitor C5, a plurality of BJTs Q2-Q5, and a plurality of resistive elements R5-R8, wherein each of the BJTs Q2-Q5 has a collector, a base, and an emitter. The electrical connection among the above circuit elements is described as follows. The capacitor C5 is coupled to the second sensing voltage V_P, the emitter of the BJT Q2 is coupled to the second sensing voltage V_P; the collector of the BJT Q3 is coupled to the base of the BJT Q2, the emitter of the BJT Q3 is coupled to the processing unit 330, the emitter of the BJT Q4 is coupled to the emitter of the BJT Q3, the base of the BJT Q4 is coupled to the base of the BJT Q3, the collector of the BJT Q5 is coupled to the base of the BJT Q4, the base of the BJT Q5 is coupled to the collector of the BJT Q2, a resistive element R5 is coupled between the second sensing signal V_P and the base of the BJT Q4, a resistive element R6 is coupled between the base of the BJT Q5 and the emitter of the BJT Q5, a resistive element R7 is coupled to the second sensing signal V_P, and a resistive element R8 is coupled between the resistive element R7 and the capacitor C5. In addition, the emitter the BJT Q3 is used to output the second control signal S_C2, and the base of the BJT Q5 is used to receive the synchronization signal.

In this embodiment, besides the photo-coupler circuit 752 shown in FIG. 7, the feedback unit 650 further includes, but is not limited to, a feedback circuit 754. The feedback circuit 754 includes a plurality of resistive elements R9, R10, R11, a Zener diode ZD3, and a capacitor C6. The resistive element R9 is coupled between the photo-coupler circuit 752 and a node NA; the resistive element R10 is coupled between the photo-coupler circuit 752 and a node NB; the Zener diode ZD3 is coupled between the node NA and a ground; the capacitor C6 is coupled between the node NA and the node NB; and the resistive element R1 1 is coupled between the node NB and the ground. In addition, the power converter 800 further includes a plurality of diodes D4 and D5. The diode D4 is coupled between the auxiliary winding LA and the emitter of the BJT Q5, and the diode D5 is coupled between the auxiliary winding LA and the resistive element R7.

Figure 9:
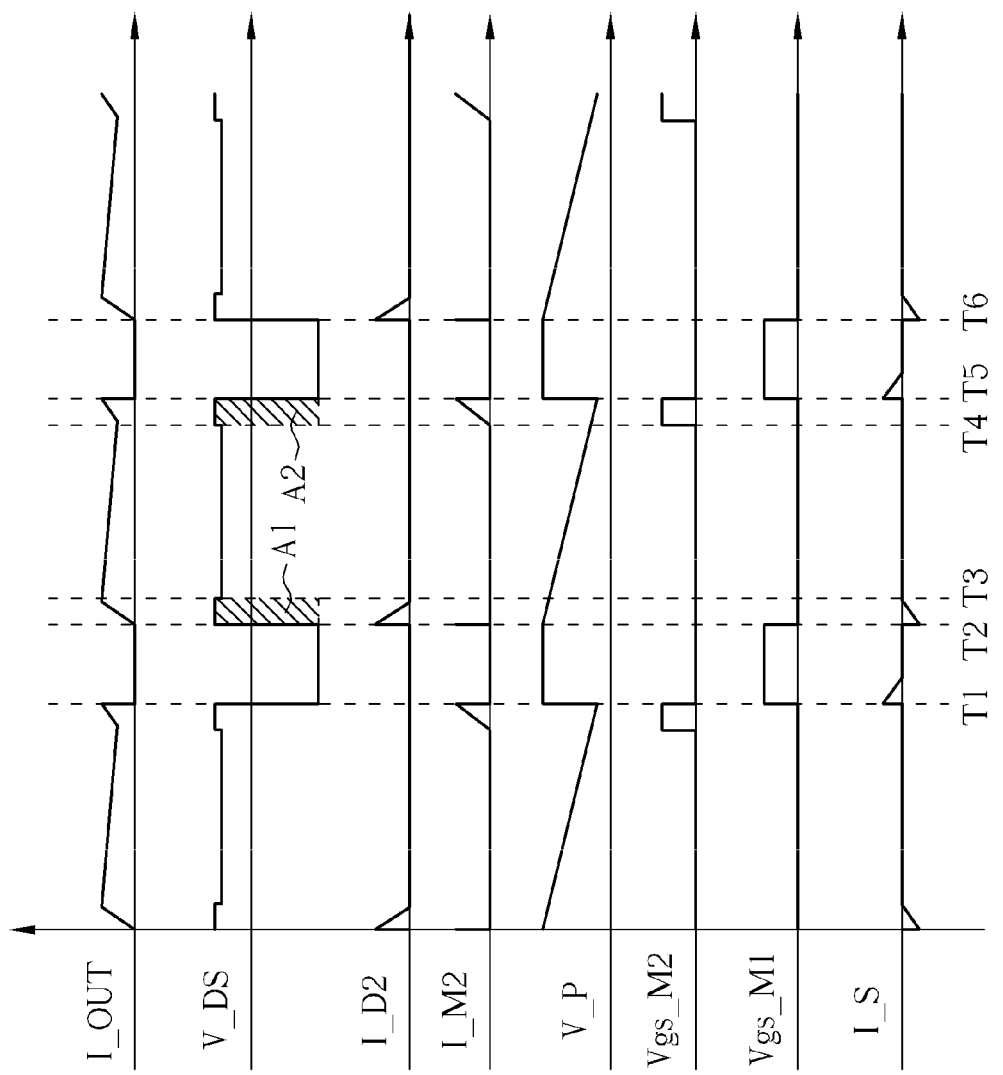
FIG. 9 is a timing diagram of signals in the power converter shown in FIG. 8.

Please refer to FIG. 8 in conjunction with FIG. 9. FIG. 9 is a timing diagram of signals in the power converter 800 shown in FIG. 8. During the period from time T1 to time T2, the power converter 800 is operated in a drive cycle. That is, the transistor M1 is in the conduction state (i.e., the switch unit 320 is in the ON state), and each of the voltage difference V_DS (between the first node N1 and the second node N2) and the second-side current I_OUT is zero. The second sensing voltage V_P is also clamped by the Zener diode ZD2, and the corresponding energy is stored in the capacitor C3.

During the period from time T2 to time T3, when the transistor M1 is switched from the conduction state to the cut-off state, the sensing power stored in the leakage inductance of the inner winding of the first transformer TX1 is released immediately through the diode D2 to the capacitor C2 for storage. Therefore, the waveform of the current I_D2 flowing through the diode D2 shows a triangular wave substantially, and the current I_M2 flowing through the transistor M2 is almost zero. In addition, the second sensing voltage V_P starts to fall off. In other words, the current I_OUT starts to fall off, and the energy stored in the capacitor C3 starts to release. Please note that, a slash area A1 of the voltage difference V_DS corresponds to the sensing power stored in the capacitor C2, and a time difference between time T2 and time T3 is relatively short.

During the period from time T3 to time T4, the current I_D2 and the current I_M2 are both zero, which implies there is no circulating current generated in this period. During the period from time T4 to time T5, after the second sensing voltage V_P falls to a predetermined voltage level (i.e., the capacitor C2 releases sufficient energy to the base of the BJT Q3), the transistor M2 starts to conduct to release the sensing power stored in the capacitor C2. Therefore, the waveform of the current I_M2 flowing through the transistor M2 shows a triangular wave substantially. Please note that, a slash area A2 of the voltage difference V_DS corresponds to the sensing power released from the capacitor C2, and a time difference between time T4 and time T5 is relatively short.

At around time T6, when the PWM control circuit 745 generates the first control signal S_C1 according to the received feedback signal S_F for preparing to drive the transistor M1, the synchronization circuit 748 may receive the first control signal S_C1 first to output a current I_S for conducting the BJTs Q4 and Q5. The transistor M2 may enter the cut-off state, and charges may be discharged from the parasitic capacitor (not shown in FIG. 8) included internally in the transistor M1 to the primary winding L1. The transistor M1 then immediately receives a delay signal S_D (corresponding to the first control signal S_C1) from the delay circuit 744 such that the transistor M1 is switched to the conduction state to thereby realize the ZVS. Please note that, the waveform of the current I_OUT shows a square wave substantially, and the problem of the sharp increase in RMS value of the current I_OUT due to the phase shift in the conventional power converter is thus solved.

As known from the above description, the power converter 800 not only realizes the ZVS in the CCM, but also solves the problems resulting from the circulating current and the phase shift of the secondary-side current. Please note that the above embodiments are for illustrative purposes only, and are not meant to be limitations of the present invention. For example, the feedback unit 650 is an optional element, and the PWM generator 643 may be combined into the processing unit 330 (as shown in FIG. 5B).

As mentioned above, the time period required to release the sensing power may also be determined according to the converted voltage. Please refer to FIG. 10, which is a diagram illustrating another exemplary power converter according to another embodiment of the present invention. The power converter 1000 includes a plurality of circuit elements, including the first transformer TX1, the output unit 310, the switch unit 320, and the processing unit 330 shown in FIG. 4, and further includes a control unit 640 and a feedback unit 650 shown in FIG. 6, wherein the control unit 640 includes the PWM controller 643 and the PWM generator 646. In this embodiment, the PWM controller 643 is coupled to the switch unit 320 (i.e., the transistor M1), and arranged for generating the first control signal S_C1 according to the converted voltage outputted V_OUT from the output unit 310 for controlling the switch unit 320 (i.e., the transistor M1) to turn on or turn off, wherein the PWM controller 643 further generates a second control signal S_C2. The PWM generator 646 is coupled to the PWM controller 643 and the processing unit 330, and arranged for generating a third control signal S_C3 according to the second control signal S_C2 and the converted voltage V_OUT outputted from the output unit 310 for controlling the processing unit 330 to process the first sensing voltage V_D. In this implementation, the power converter 1000 may further include a feedback unit 650. The feedback unit 650 is coupled between the output unit 310 and the control unit 640, and arranged for generating the feedback signal S_F according to the converted voltage V_OUT outputted from the output unit 310, wherein the PWM controller 643 generates the first control signal S_C1 according to the feedback signal S_F, and the PWM generator 646 generates the third control signal S_C3 according to the second control signal S_C2 and the feedback signal S_F. In addition, the feedback unit 650 may include, but is not limited to, the photo-coupler circuit 752 shown in FIG. 7 for improving the signal quality of the feedback signal S_F.

In this implementation, when a voltage level of the second control signal S_C2 is higher than a voltage level of the feedback signal S_F, which implies that the converted voltage V_OUT keeps decreasing and the power converter 1000 tends to enter a next drive cycle, the PWM generator 646 may control the processing unit 330 to release the stored sensing power to the primary winding L1.

Figure 10:
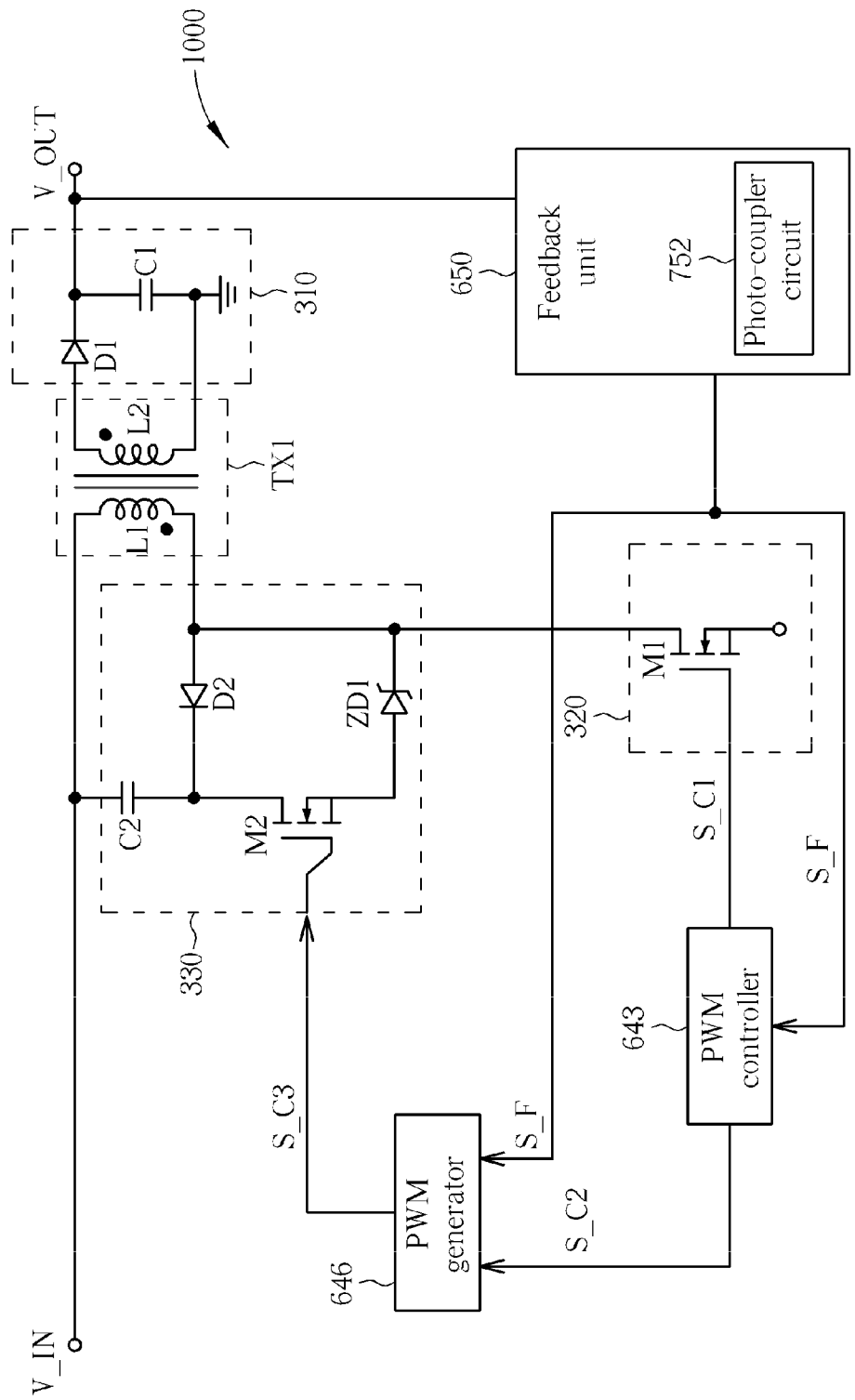
FIG. 10 is a diagram illustrating another exemplary power converter according to another embodiment of the present invention.
Figure 11:
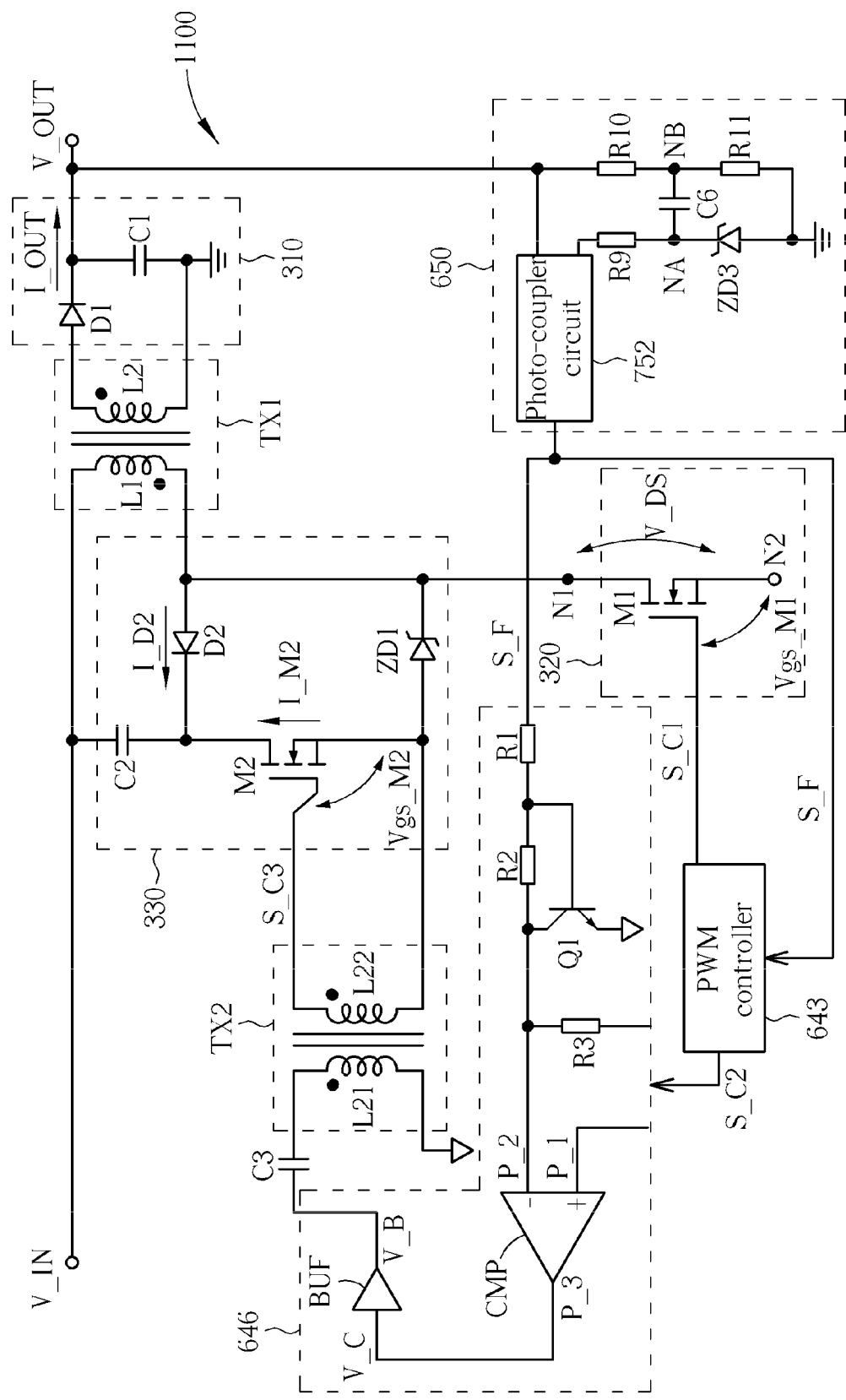
FIG. 11 is a diagram illustrating an exemplary implementation of the power converter shown in FIG. 10.

Please refer to FIG. 11, which is a diagram illustrating an exemplary implementation of the power converter 1000 shown in FIG. 10. As shown in FIG. 10, the PWM generator 646 includes, but is not limited to, a BJT Q1, a plurality of resistive elements R1-R3, a comparison element CMP (e.g., a comparator), and a buffer element BUF (e.g., a buffer). The BJT Q1 has a collector, a base, and an emitter, wherein the emitter is coupled to a ground. The resistive element R1 is coupled between the feedback unit 650 and the base of the BJT Q1, and arranged for receiving the feedback signal S_F. The resistive element R2 is coupled between the collector and the base of the BJT Q1. The resistive element R3 is coupled to the collector of the BJT Q1. The comparison element CMP has a first input port P_1, a second input port P_2, and an output port P_3, wherein the first input port P_1 is used to receive the second control signal S_C2, the second input port P_2 is coupled to the collector of the BJT Q1, and the output port P_3 is used to generate a comparison voltage V_C according to the second control signal S_C2 and a voltage of the collector of the BJT Q1. The buffer element BUF is coupled to the output port P_3, and arranged for receiving the comparison voltage V_C to generate a buffer voltage V_B.

In this embodiment, the power converter 1100 may further include a capacitor C3 and a second transformer TX2. The capacitor C3 is coupled to the buffer element BUF, and arranged for receiving the buffer voltage V_B. The second transformer TX2 has a first winding L21 and a second winding L22, wherein the first winding L21 is coupled to the capacitor C3, the second winding L22 is coupled to the processing unit 330, and the first winding L21 generates the third control signal S_C3 from the second winding L22 according to the buffer voltage V_B. In general, as the power converter may be applied to the high voltage side and the low voltage side, and the power transistor acting as the switch (e.g., the transistors M1 and M2) may need higher driving voltage, the power converter 1100 may enhance the driving voltage by the second transformer TX2 to drive the transistor M2.

Figure 12:
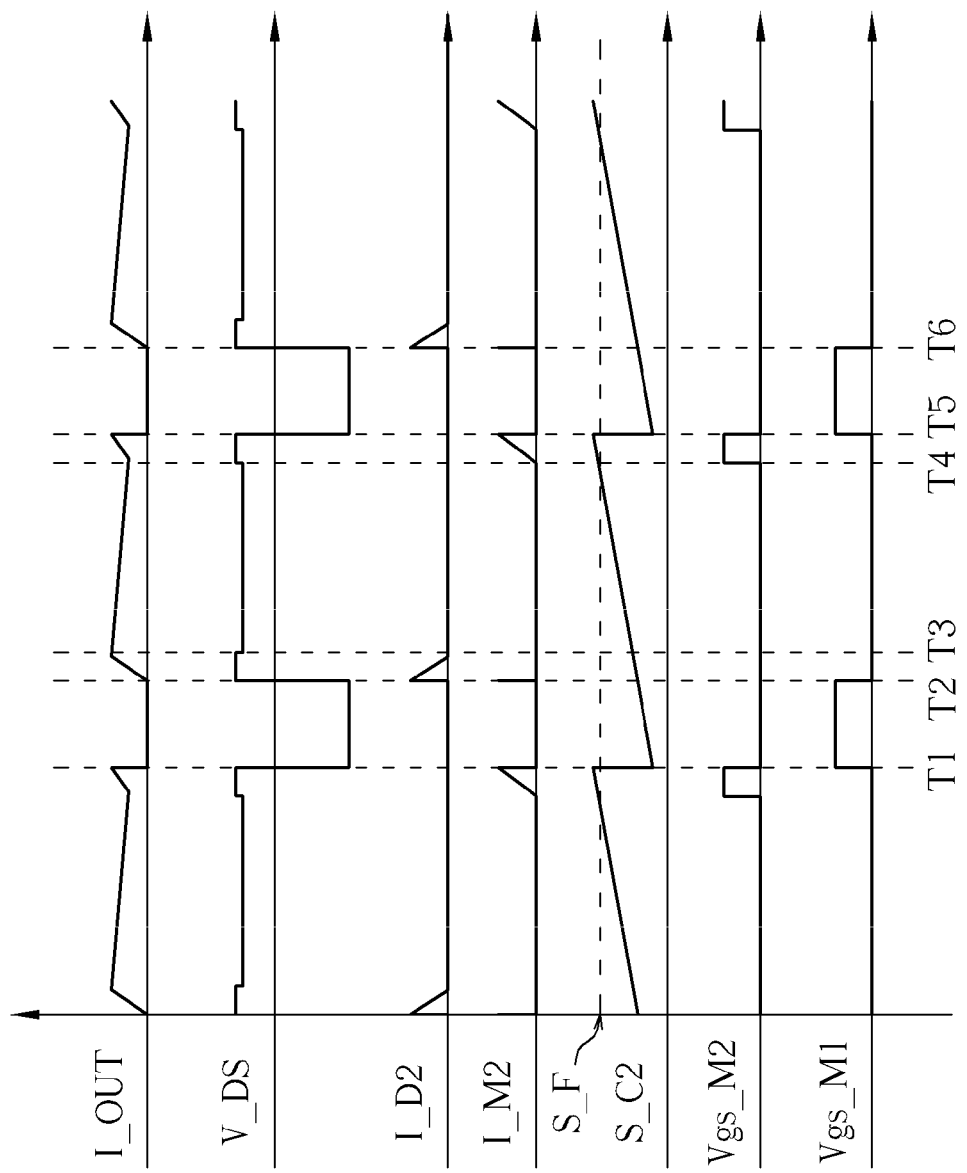
FIG. 12 is a timing diagram of signals in the power converter shown in FIG. 11.

Please refer to FIG. 11 in conjunction with FIG. 12. FIG. 12 is a timing diagram of signals in the power converter 1100 shown in FIG. 11. During the period from time T1 to time T2, the power converter 1100 is operated in a drive cycle. That is, the transistor M1 is in the conduction state (i.e., the switch unit 320 is in the ON state), and each of a voltage difference V_DS (between the first node N1 and the second node N2) and the second-side current I_OUT is zero. In addition, the voltage level of the second control signal S_C2 keeps increasing.

During the period from time T2 to time T3, when the transistor M1 is switched from the conduction state to the cut-off state, the sensing power stored in the leakage inductance of the inner winding of the first transformer TX1 is released immediately through the diode D2 to the capacitor C2 for storage. Therefore, the waveform of the current I_D2 flowing through the diode D2 shows a triangular wave substantially, and the current I_M2 flowing through the transistor M2 is almost zero. Please note that, a slash area A1 of the voltage difference V_DS corresponds to the sensing power stored in the capacitor C2, and a time difference between time T2 and time T3 is relatively short.

During the period from time T3 to time T4, the current I_D2 and the current I_M2 are both zero, which implies there is no circulating current generated in this period. During the period from time T4 to time T5, after the voltage level of the second control signal S_C2 is higher than the voltage level of the feedback signal S_F, the comparison element CMP may output the comparison voltage V_C having a higher voltage level, and therefore the transistor M2 starts to conduct to release the sensing power stored in the capacitor C2. In addition, the waveform of the current I_M2 flowing through the transistor M2 shows a triangular wave substantially. Please note that, a slash area A2 of the voltage difference V_DS corresponds to the sensing power released from the capacitor C2, and a time difference between time T4 and time T5 is relatively short.

At around time T6, the voltage level of the second control signal S_C2 falls below the voltage level of the feedback signal S_F. Thus, the comparison voltage V_C is at a low voltage level, which makes the transistor M2 enter the cut-off state. Next, charges may be discharged from the parasitic capacitor (not shown in FIG. 11) included internally in the transistor M1 to the primary winding L1, and then the transistor M1 immediately receives the first control signal S_C1 from the PWM controller 643 such that the transistor M1 is switched to the conduction state to thereby realize the ZVS. Please note that, the waveform of the current I_OUT shows a square wave substantially, and the problem of the sharp increase in RMS value of the current I_OUT due to the phase shift in the conventional power converter is thus solved.

To sum up, a power converter which may realize the ZVS in the CCM is proposed. The proposed power converter may store and recover the sensing power generated in the switching operation, and solve the problems of the generated circulating current and the phase shift due to the secondary-side current in the conventional power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is
1. A power converter, comprising:
an output unit, for outputting a converted voltage;
a first transformer, comprising:
a primary winding, coupled between an input voltage and a first node; and a secondary winding, coupled to the output unit;
a switch unit, coupled between the first node and a second node, for controlling magnetic flux direction of the primary winding; and
a processing unit, coupled between the input voltage and the first node, wherein when the switch unit is in an OFF state, the processing unit is arranged for receiving a first sensing voltage of the first node and storing a sensing power of the first sensing voltage through a first path, isolating the first sensing voltage from feeding in through a second path different from the first path simultaneously, and then releasing the stored sensing power through the second path, where the first sensing voltage is generated in response to the switch unit switching from an ON state to the OFF state; wherein the processing unit further comprises:
a capacitor, coupled between the input voltage and a third node; an auxiliary switch, coupled between the third node and a forth node; a diode, coupled between the first node and the third node, wherein the diode is disposed in the first path, and arranged for receiving the first sensing voltage and storing the sensing power into the capacitor when the switch unit is switched from the ON state to the OFF state; a Zener diode, coupled between the first node and the forth node, wherein the Zener diode is disposed in the second path, and arranged for isolating the first sensing voltage when the switch unit is switched to the OFF state; wherein the auxiliary switch is turned on after the switch unit is turned off, the auxiliary switch is turned off before the switch unit is turned on, and the processing unit releases the sensing power during a time period in which the auxiliary switch is turned on.

2. The power converter of claim 1, wherein the sensing power generates a voltage spike.

3. The power converter of claim 1, wherein a sum of a time period required by the processing unit to receive the first sensing voltage and store the sensing power and a time period required by the processing unit to release the stored sensing power is less than a time period in which the switch unit stays in the OFF state.

4. The power converter of claim 1, further comprising:
a control unit, coupled to the processing unit, for referring to the converted voltage outputted from the output unit to determine a time period required by the processing unit to release the sensing power.

5. The power converter of claim 1, further comprising:
a control unit, coupled to the processing unit, for referring to the first sensing voltage to determine a time period required by the processing unit to release the sensing power.

6. The power converter of claim 1, wherein when the switch unit is going to be switched from the OFF state to the ON state, a voltage difference between the first node and the second node is substantially zero.

7. The power converter of claim 1, wherein a time period required by the processing unit to release the stored sensing power and a time period in which the switch unit stays in the ON state are non-overlapping.

8. The power converter of claim 1, wherein each of the auxiliary switch, the diode, and the Zener diode has no current flowing therethrough during a specific period in which the switch unit stays in the OFF state.

9. The power converter of claim 1, further comprising:
a control unit, comprising:
a pulse width modulation controller, for generating a first control signal according to the converted voltage outputted from the output unit for controlling the switch unit to turn on or turn off.

10. The power converter of claim 9, wherein the pulse width modulation controller comprises:
a delay circuit, coupled to the switch unit; and
a pulse width modulation control circuit, coupled to the delay circuit, for generating the first control signal to the delay circuit according to the converted voltage outputted from the output unit, wherein the delay circuit generates a delay control signal according to the first control signal for controlling the switch unit to turn on or turn off.

11. The power converter of claim 9, further comprising:
a feedback unit, coupled between the output unit and the pulse width modulation controller, for generating a feedback signal according to the converted voltage outputted from the output unit.

12. The power converter of claim 11, wherein the feedback unit comprises:
a photo-coupler circuit; and
a feedback circuit, comprising:
a first resistive element, coupled between the photo-coupler circuit and a third node;
a second resistive element, coupled between the photo-coupler circuit and a forth node;
a Zener diode, coupled between the third node and a ground;
a capacitor, coupled between the third node and the forth node; and
a third resistive element, coupled between the forth node and the ground.

13. The power converter of claim 9, wherein the control unit further comprises:
a pulse width modulation generator, coupled to the pulse width modulation controller and the processing unit, for generating a second control signal according to the first control signal and the first sensing voltage for controlling the processing unit to process the first sensing voltage.

14. The power converter of claim 13, wherein the first transformer further comprises an auxiliary winding disposed on a same side where the primary winding of the first transformer is disposed, and the pulse width modulation generator comprises:
a sensing circuit, for sensing the first sensing voltage with the auxiliary winding, and accordingly generating a second sensing voltage;
a synchronization circuit, coupled to the pulse width modulation controller, for generating a synchronization signal according to the first control signal; and
a pulse width modulation generation circuit, coupled to the processing unit, the sensing circuit, and the synchronization circuit, for generating the second control signal according to the second sensing voltage and the synchronization signal in order to control a time period required by the processing unit to isolate the first sensing voltage and a time period required by the processing unit to release the stored sensing power.

15. The power converter of claim 14, wherein when the second sensing voltage falls to a predetermined voltage level, the pulse width modulation generation circuit controls the processing unit to start releasing the stored sensing power to the primary winding; and when the sensing power is totally released, the pulse width modulation generation circuit refers to the synchronization signal to stop the processing unit from processing the first sensing voltage, and the switch unit is switched from the OFF state to the ON state according to the first control signal.

16. The power converter of claim 14, wherein the sensing circuit comprises:
a bipolar junction transistor, having a collector, a base, and an emitter;
a first resistive element, coupled to the emitter;
a second resistive element, coupled to the base;
a Zener diode, coupled to the base, for clamping the second sensing voltage; and
a capacitor, coupled to the Zener diode, for storing the second sensing voltage.

17. The power converter of claim 14, wherein the synchronization circuit comprises:
a first resistive element, coupled to the pulses width modulation controller, for receiving the first control signal;
a capacitor, coupled to the first resistive element;
a second transformer, having a first winding and a second winding, wherein the first winding is coupled to the capacitor, and the first winding generates a synchronization sensing voltage across the second winding according to the first control signal;
a diode, coupled to the second winding, for receiving the synchronization sensing voltage; and
a second resistive element, coupled to the diode, for generating the synchronization signal according to the synchronization sensing voltage.

18. The power converter of claim 14, wherein the pulse width modulation generation circuit comprises:
a capacitor, coupled to the second sensing voltage;
a first bipolar junction transistor, having a first collector, a first base, and a first emitter, wherein the first emitter is coupled to the second sensing voltage;
a second bipolar junction transistor, having a second collector, a second base, and a second emitter, wherein the second collector is coupled to the first base, the second emitter is coupled to the processing unit, and the second emitter is used to output the second control signal;
a third bipolar junction transistor, having a third collector, a third base, and a third emitter, wherein the third emitter is coupled to the second emitter, and the third base is coupled to the second base;
a forth bipolar junction transistor, having a forth collector, a forth base, and a forth emitter, wherein the forth collector is coupled to the third base, the forth base is coupled to the first collector, and the forth base is used to receive the synchronization signal;
a first resistive element, coupled between the second sensing signal and the third base;
a second resistive element, coupled between the forth base and the forth emitter;
a third resistive element, coupled to the second sensing signal; and
a forth resistive element, coupled between the third resistive element and the capacitor.

19. The power converter of claim 1, further comprising:
a control unit, comprising:
a pulse width modulation controller, coupled to the switch unit, for generating a first control signal according to the converted voltage outputted from the output unit for controlling the switch unit to turn on or turn off, wherein the pulse width modulation controller further generates a second control signal; and a pulse width modulation generator, coupled to the pulse width modulation controller and the processing unit, for generating a third control signal according to the second control signal and the converted voltage outputted from the output unit for controlling the processing unit to process the first sensing voltage.

20. The power converter of claim 19, further comprising:
a feedback unit, coupled between the output unit and the control unit, for generating a feedback signal according to the converted voltage outputted from the output unit;
wherein the pulse width modulation controller generates the first control signal according to the feedback signal, and the pulse width modulation generator generates the third control signal according to the second control signal and the feedback signal.

21. The power converter of claim 20, wherein the feedback unit comprises:
a photo-coupler circuit; and
a feedback circuit, comprising:
    a first resistive element, coupled between the photo-coupler circuit and a third node;
    a second resistive element, coupled between the photo-coupler circuit and a forth node;
    a Zener diode, coupled between the third node and a ground;
    a capacitor, coupled between the third node and the forth node; and
    a third resistive element, coupled between the forth node and the ground.

22. The power converter of claim 20, wherein when a voltage level of the second control signal is higher than a voltage level of the feedback signal, the pulse width modulation generator controls the processing unit to release the stored sensing power to the primary winding.

23. The power converter of claim 20, wherein the pulse width modulation generator comprises:
a bipolar junction transistor, having a collector, a base, and an emitter, wherein the emitter is coupled to a ground;
a first resistive element, coupled between the feedback unit and the base, for receiving the feedback signal;
a second resistive element, coupled between the collector and the base;
a third resistive element, coupled to the collector;
a comparison element, having a first input port, a second input port, and an output port, wherein the first input port is arranged to receive the second control signal, the second input port is coupled to the collector, and the output port is arranged to generate a comparison voltage according to the second control signal and a voltage of the collector; and
a buffer element, coupled to the output port, for receiving the comparison voltage to generate a buffer voltage.

24. The power converter of claim 23, further comprising:
a capacitor, coupled to the buffer element, for receiving the buffer voltage; and
a second transformer, having a first winding and a second winding, wherein the first winding is coupled to the capacitor, the second winding is coupled to the processing unit, and the first winding generates a third control signal from the second winding according to the buffer voltage.

* * * * *